Patented Apr. 27, 1954

2,676,874

UNITED STATES PATENT OFFICE 2,676,874

METHOD OF AND MEANS FOR THE RAPID APPROXIMATE QUANTITATIVE ESTIMATION OF CHLORIDE CONCENTRATION IN AQUEOUS LIQUIDS

John Berchmans Devine, Melbourne, Victoria, Australia

No Drawing. Application August 30, 1950, Serial No. 182,392

Claims priority, application Australia September 27, 1949

6 Claims. (Cl. 23—230)

This invention relates to a method of and means for the rapid approximate quantitative estimation of a reactive chemical radicle or group and the like in liquids, and is particularly concerned with the estimation of chlorides in industrial processing or manufactures, and in body liquids such as blood and urine.

In the past the estimation of the chloride concentration of such liquids has not been as rapid as is desirable for frequent routine tests and, in the case of body fluids such as urine, has required the services of a skilled bio-chemist.

It is the principal objective of the present invention to provide a convenient and effective method for conducting the approximate quantitative estimation or concentration of a chemical radicle or group in liquids more rapidly than heretofore and by persons without specialised chemical or bio-chemical training; for example, the estimation of chloride concentration in urine may be safely conducted by the nursing staff of a hospital.

As a further object of the invention, there is the provision of simple means, in the form of a test or indicator paper and the like, for effecting the above method.

With the above stated principal objective in view there is provided according to the present invention a method of rapidly conducting the approximate quantitative estimation by a time test of chloride concentration in body fluids and other liquids which do not interfere with and mask the formation of a color change as defined herein, which method comprises contacting the liquid with an indicator article selected from the group consisting of paper strip, booklets of paper strip, tape, string and like cellulosic absorbent material impregnated with silver chromate reagent in concentration insufficient to cause appreciable lessening of the chloride concentration in the liquid and reactive with said chloride radical to form an expected color change in the indicator article, measuring the time lapse between the contacting of the liquid with the indicator article and the appearance of the color change therein, and comparing the time taken with known times required for color change of the indicator article relative to known concentrations of chloride radical, to thereby estimate approximately the concentration of the chloride in the liquid. By this method, a graph of the time/rate of reaction resulting in said color change tends to be a direct relation of the concentration of the chloride solution being tested, as the latter does not appreciably alter its concentration during the test.

It will be appreciated that the method of the present invention is, in the applications for which it is suited, much more rapid than previous methods of chemical or bio-chemical analysis, and requires a minimum of technical skill for its execution.

According to the invention the indicator paper or the like, more broadly, is an indicator paper or booklet of indicator papers or an indicator tape or string or the like suitable for conducting the method as claimed in any one of claims 1 to 6, comprising a strip of paper, tape, string or the like of cellulosic or other absorbent material impregnated with a selected concentration of a reagent reactive with a radicle or group present in the test liquid and known to form an expected color change on the indicator article within measurable amounts of time, varying with the concentration of the radicle or group in the test liquid, for the purpose specified in said claims.

The method may be carried out either by immersing the indicator paper in the liquid to be tested (such as urine) and observing the time taken, timed by stop-watch or second hand, for the change of color such as the bleaching of the color, or by applying a drop of the liquid (such as blood) to the paper and observing the time as blood) to the paper and observing the time taken for the appearance of a colored ring around the drop, the color change in this case being produced as a result of diffusion of the liquid through the paper. In each case, the times taken correspond to various percentage concentrations of the radicle or group tested for in the liquid.

In one preferred embodiment of the invention, suitable for the estimation of chlorides in liquids such as urine, indicator paper is produced by impregnating filter paper with silver chromate. For this purpose, the following bath is prepared:

Silver chromate bath

| | Mls. |
|---|---|
| 5% silver nitrate solution | 400 |
| 10% potassium chromate solution | 200 |
| Distilled water | 360 |
| 0.880 ammonia solution | 40 |

The silver nitrate and potassium chromate solutions are mixed, and the precipitated silver chromate dissolved by the addition of the ammonia diluted with the water.

Acetic acid bath

3% acetic acid in distilled water is prepared as a separate bath.

A number of sheets of paper are cut to the desired size, the first sheet dipped in the silver chromate bath, withdrawn, using rubber gloves on the hands, and blotted with the second sheet to remove excess solution. It is then passed through the acetic acid bath, which causes precipitation of silver chromate in the body of the paper. The sheet is given two washes by passing through dishes of distilled water, then dried, preferably air-dried, in a horizontal position in the dark.

The second sheet is then dipped, and the process continued.

*Paper*

The most satisfactory paper of many samples which have been tried is the filtered paper sold by the manufacturers, under the name "Whatman's Filter Paper No. 1." In this connection, it will be appreciated that due to the variable absorption characteristics of the paper different filter papers from the same bath will react with chloride solutions at different speeds. Because of this, before commencing the manufacture of a batch of indicator papers, a trial piece should be passed through the solutions, dried, and tested for speed. When immersed in a 0.3% solution of sodium chloride, it should bleach in 5 to 6 seconds. If the speed is too slow more water should be added to adjust the bath; if too fast, it must be strengthened by adding silver nitrate and potassium chromate in the same proportions as above. The amount of silver chromate solution absorbed by the paper is about 10 mls. per square foot. Alternatively, paper or the like of a suitable quality may be passed through a 1% aqueous solution of potassium chromate. The excess solution is removed by squeezing the wet paper between rollers, and the paper is then passed through a 0.5% aqueous solution of silver nitrate. The reagents react to produce a paper impregnated with silver chromate, and the excess of either reagent is removed by washing the paper with distilled water. The paper is then passed through rollers and dried, and may then be used for the estimation of the chloride concentration of liquids.

In the above example, alcoholic solutions of ammonium bichromate and silver nitrate may be substituted for the aqueous solutions of potassium chromate and silver nitrate respectively.

As stated the indicator papers of the invention are useful for the rapid determination, by both nurses and patients of soluble chlorides in urine. In particular, they are of use where specimens of urine must be tested often as is required during intravenous therapy.

A piece of the paper, conveniently half a leaflet, is immersed completely in the sample, and the time for the paper to bleach white is noted by the seconds hand of a watch. Any brown specks remaining unbleached are disregarded, the discharge of practically all the color being unmistakable.

The strength of these papers is such that if they become white immediately, or within 5 to 6 seconds, the urine contains not less than 0.3% of chloride as sodium chloride, a quantity which is usually considered indicative of an adequate saline intake.

The relationship of chloride concentration and time for bleaching is as follows:

| Sodium chloride, percent w./v. | Time in seconds |
|---|---|
| 0.5 | 1 to 1.5. |
| 0.4 | 2 to 3. |
| 0.3 | 5 to 6. |
| 0.2 | 13 to 15. |
| 0.1 | 45 to 55. |

Although it is possible to test for chloride in other physiological fluids with these papers, or to use chloride-containing fluids of greater concentration after appropriate dilution with distilled water, this should not be done without recalibrating the paper, since the rate of diffusion of chloride into the paper may vary.

The following precautions should be observed in the use and handling of indicator papers, according to the invention, i. e. the papers, being slightly photo-sensitive, should be returned to a closed box when not in use; the papers must not be touched with moist fingers, which otherwise will contaminate them with chlorides; and it is desirable to allow the indicator paper to cool to room temperature before use, though the difference in time of bleaching over a moderate range of temperature is not clinically significant. On the latter point, tests made with silver chromate impregnated paper at different temperature, showed the following characteristics:

| Temperature, C. | Time Taken to Bleach ||
|---|---|---|
| | 0.3% NaCl | 0.15% NaCl |
| | Seconds | Seconds |
| 0 | 8 | 38 |
| 20 | 7 | 30 |
| 30 | 6 | 25 |

Hence under normal "room temperature" conditions there would be a very adequate differentiation between chloride of various concentrations, regardless of the actual temperature.

It has been found that the actual bleaching time is reproducible for various batches, which all give virtually the same curve for time against concentration, and also that the times remain constant so long as the paper is stored with reasonable protection from light.

Accordingly, it will be appreciated that a slip of the paper produced as above is immersed in urine containing 0.3% by weight of sodium chloride, the color of the paper fades from salmon red to a faint yellow in 8 seconds, whereas in urine containing 0.15% by weight of sodium chloride, the color change occupies approximately 30 seconds.

When estimating the concentration of chlorides in blood, the opacity of the blood renders the above procedure unsuitable, and a number of papers of graded strengths are employed. The concentration of sodium chloride is estimated by placing a drop of blood on each of several strips of test paper of differing strengths and noting on which strip a yellow ring appears around the spot of blood in a given time.

It is a feature of the invention of considerable practical importance that only one to five drops of blood are required to carry out a test, the tapping of a vein being unnecessary.

The papers must be protected from moisture during handling, and accordingly may be grouped in booklets with a strip of water resistant material covering the bound edges of the strips and part of the outside surfaces of the booklet contiguous thereto.

Another and preferable method of protection is the dispensing of the test papers from a slotted container of water resistant material, the papers being folded so that the withdrawal of each brings forward the edge of the next paper through the slot. This arrangement has the added advantage that the container may be light-proof and papers impregnated with light-sensitive materials will thus be protected against deterioration.

Although the invention has been particularly described with reference to the preparation of indicator papers made from filter paper, it will be understood that the indicator article may equally well be made from tape, string or other cellulose material having suitable absorbent properties and of a quality suitable for a reasonable degree of standardisation in quality. Similarly, it will be appreciated that the invention is applicable to the rapid approximate quantitative estimation of radicles or groups other than chlorides, and in industrial liquors or solutions. In each instance, a suitable reactive reagent is chosen to produce or form a color reaction with the radicle or group to be determined, and the reagent is impregnated into the indicator paper article or the like in a concentration which will produce the color change in a measurable amount of time, to estimate the concentration of the radicle or group in the liquid.

The indicator papers of the invention may be dispensed in booklets, each booklet having a specimen "end point" on the cover, together with a list of times of color change and their equivalent in milligrams per hundred cubic centimetres of the solution being tested. In practice it has been found that the "end point" was definite; occurring over at most a few seconds, and easily read in artificial light.

It will also be understood that the time taken for the color reaction of the indicator paper according to the invention, depends on the character and thickness and size of the paper; the humidity and temperature; the presence in the solution being tested of substances (e. g. protein) which might form a barrier to "wetting"; and many other factors. Most of the above-mentioned factors produce negligible variations which are of no importance to the results, but standard papers of standard character and thickness are essential. The result of interaction of two reagents may be graphed as to rate and time, and the result would be a hyperbolic curve. Since the amount of reagent in the paper is so small in comparison to the volume of fluid being tested, any alterations in the concentration of this fluid which might be brought about by the reagents in the paper are so very small that, for example, the chloride concentration of the solution being tested might be considered to be constant, a fact which modifies the time-rate graph of the reaction. If the reagents, paper, and temperature are kept constant, the time-rate of reaction should be proportional to the concentration of the solution being tested and would be a measure of this concentration. Papers which were impregnated as described, showed that the time of reaction was proportional to the chloride concentration in the solution being tested.

I claim:

1. Method of rapidly conducting the approximate quantitative estimation to chloride concentration in aqueous liquids by the bleaching of an indicator article and wherein the time taken to bleach the indicator is related to the chloride concentration in the liquid being tested, which method comprises contacting a sample of liquid with an indicator article consisting of a water-absorbent cellulosic material in a dry condition and impregnated with silver chromate, said material having such an amount of silver chromate deposited therein and also having such a water-diffusion rate therethrough that said material is bleached within any of the following periods of time measured against the following corresponding concentrations of sodium chloride by weight in aqueous solution at 20° C.:

| | Seconds |
|---|---|
| 0.5% NaCl | 1 to 1.5 |
| 0.4% NaCl | 2 to 3 |
| 0.3% NaCl | 5 to 6 |
| 0.2% NaCl | 13 to 15 |
| 0.1% NaCl | 45 to 55 | upon contacting the material with the liquid sample, the time taken to bleach the indicator article relative to said periods of time serving to indicate the chloride concentration in the liquid sample.

2. Method of rapidly conducting the approximate quantitative estimation of chloride concentration in urine by the bleaching of an indicator article and wherein the time taken to bleach the indicator is related to the chloride concentration in the liquid being tested, which method comprises contacting a sample of urine with an indicator article consisting of a water-absorbent cellulosic material in a dry condition and impregnated with silver chromate said material having such an amount of silver chromate deposited therein and also having such a water diffusion rate therethrough that said material is bleached within any of the following periods of time measured against the following corresponding concentrations of sodium chloride by weight in aqueous solution at 20° C.:

| | Seconds |
|---|---|
| 0.5% NaCl | 1 to 1.5 |
| 0.4% NaCl | 2 to 3 |
| 0.3% NaCl | 5 to 6 |
| 0.2% NaCl | 13 to 15 |
| 0.1% NaCl | 45 to 55 | upon contacting the material with the urine sample, the time taken to bleach the indicator article relative to said periods of time serving to indicate the chloride concentration in the urine sample.

3. An indicator article for rapidly conducting the approximate quantitative estimation of chloride concentration in aqueous liquids by the bleaching of the indicator and wherein the time taken to bleach the indicator is related to the chloride concentration in the liquid being tested, said indicator comprising a water-absorbent cellulosic material in a dry condition and impregnated with silver chromate, said material having such an amount of silver chromate deposited therein and also having such a water diffusion rate therethrough that said material is bleached within any of the following periods of time, measured against the following corresponding concentrations of sodium chloride, by weight in aqueous solution at 20° C.:

| | Seconds |
|---|---|
| 0.5% NaCl | 1 to 1.5 |
| 0.4% NaCl | 2 to 3 |
| 0.3% NaCl | 5 to 6 |
| 0.2% NaCl | 13 to 15 |
| 0.1% NaCl | 45 to 55 | upon contacting the material with a sample of the liquid being tested.

4. An indicator article for rapidly conducting the approximate quantitative estimation of chloride concentration in urine by the bleaching of the indicator and wherein the time taken to bleach the indicator is related to the chloride concentration in the urine being tested said indicator comprising a water-absorbent cellulosic material in a dry condition and impregnated with silver chromate, said material having such an amount of silver chromate deposited therein and also having such a water diffusion rate therethrough that said material is bleached within any of the following periods of time, measured against the following corresponding concentrations of sodium chloride, by weight in aqueous solution at 20° C.:

| | Seconds |
|---|---|
| 0.5% NaCl | 1 to 1.5 |
| 0.4% NaCl | 2 to 3 |
| 0.3% NaCl | 5 to 6 |
| 0.2% NaCl | 13 to 15 |
| 0.1% NaCl | 45 to 55 | upon contacting the material with a sample of urine.

5. Method of making an indicator article for rapidly conducting the approximate quantitative estimation of chloride concentration in aqueous liquids by the bleaching of the indicator and wherein the time taken to bleach the indicator is related to the chloride concentration in the aqueous liquid being tested, which method comprises impregnating a water-absorbent fibrous cellulosic material with an aqueous solution containing silver chromate dissolved in dilute ammonium hydroxide, treating the impregnated material with a dilute acid free of chloride thereby to precipitate silver chromate on to the fibres of material, and drying the material so impregnated, said dried material having an amount of silver chromate deposited therein and also having such a water-diffusion rate therethrough that said material is bleached within any of the following periods of time, measured against the following corresponding concentrations of sodium chloride, by weight in aqueous solution at 20° C.:

| | Seconds |
|---|---|
| 0.5% NaCl | 1 to 1.5 |
| 0.4% NaCl | 2 to 3 |
| 0.3% NaCl | 5 to 6 |
| 0.2% NaCl | 13 to 15 |
| 0.1% NaCl | 45 to 55 | upon contacting the material with a sample of the liquid being tested.

6. Method of making an indicator article for rapidly conducting the approximate quantitative estimation of chloride concentration in urine by the bleaching of the indicator and wherein the time taken to bleach the indicator is related to the chloride concentration in the urine being tested, which method comprises impregnating a water-absorbent fibrous cellulosic material with aqueous solution containing silver chromate dissolved in dilute ammonium hydroxide, treating the impregnated material with a dilute acid free of chloride thereby to precipitate silver chromate on to the fibres of said material, and drying the material so impregnated, said dried material having such an amount of silver chromate deposited therein and also having such a water-diffusion rate therethrough that said material is bleached within any of the following periods of time measured against the following corresponding concentrations of sodium chloride by weight in aqueous solution at 20° C.:

| | Seconds |
|---|---|
| 0.5% NaCl | 1 to 1.5 |
| 0.4% NaCl | 2 to 3 |
| 0.3% NaCl | 5 to 6 |
| 0.2% NaCl | 13 to 15 |
| 0.1% NaCl | 45 to 55 | upon contacting the material with a sample of urine.

References Cited in the file of this patent

UNITED STATES PATENTS

| Number | Name | Date |
|---|---|---|
| 691,249 | Dieterich | Jan. 14, 1902 |
| 1,216,303 | Freeman | Feb. 20, 1917 |
| 2,105,226 | Pratt | Jan. 11, 1938 |
| 2,290,436 | Kamlet | July 11, 1942 |

OTHER REFERENCES

Method of Analysis, A. O. A. C., Fifth ed., Assn. of Off. Agriculture Chemists, 1940, page 528.

Indicators and Test Papers, Cohn, Wiley and Sons, N. Y., 1899, pages 208-209.